(12) United States Patent
Counterman

(10) Patent No.: US 6,640,752 B1
(45) Date of Patent: Nov. 4, 2003

(54) BOILER AND REGENERATIVE AIR PREHEATER ARRANGEMENT TO ENHANCE $SO_3$ CAPTURE

(75) Inventor: Wayne S. Counterman, Wellsville, NY (US)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/383,931

(22) Filed: Mar. 7, 2003

(51) Int. Cl.$^7$ ................................................ F23L 15/02
(52) U.S. Cl. .............................. 122/1 A; 165/8; 165/10
(58) Field of Search .................... 122/1 A, DIG. 2; 165/8, 9, 10

(56) References Cited

U.S. PATENT DOCUMENTS 3,666,001 A * 5/1972 Johnson ..................... 165/9
5,915,340 A * 6/1999 Cronin et al. ............... 122/1 A

* cited by examiner

Primary Examiner—Gregory Wilson
(74) Attorney, Agent, or Firm—Russell W. Warnock

(57) ABSTRACT

An air preheater for use with a boiler which discharges a flow of flue gas containing $SO_3$ comprises a housing having oppositely disposed hot and cold ends. The hot end includes an air outlet duct, having a combustion air duct and an excess air duct, and a flue gas inlet duct, the combustion air duct and flue gas inlet duct are in fluid communication with the boiler. The cold end includes an air inlet duct and a flue gas outlet duct in fluid communication with the atmosphere. A rotor rotatably mounted in the housing includes an air sector in fluid communication with the air inlet and outlet ducts and a flue gas sector in fluid communication with the flue gas inlet and outlet ducts. A plurality of heat exchange element basket assemblies rotate through the air and flue gas sectors, with the heat exchange element basket assemblies absorbing heat from the flow of flue gas in the flue gas sector and discharging heat to the flow of air in the air sector. The flow of excess air cools the heat exchange basket element assemblies below the dew point of the $SO_3$, thereby condensing the $SO_3$ for removal from the flow of flue gas.

16 Claims, 4 Drawing Sheets

BOILER AND REGENERATIVE AIR PREHEATER ARRANGEMENT TO ENHANCE SO₃ CAPTURE

BACKGROUND OF THE INVENTION

This invention relates generally to a steam generating system having a coal or oil fired boiler and a regenerative air preheater. More particularly, the present invention relates to a steam generating system having a boiler and a rotary regenerative air preheater.

During the combustion process in the boiler, the sulfur in the fuel is oxidized to $SO_2$. After the combustion process, some amount of $SO_2$ is further oxidized to $SO_3$, with typical amounts on the order of 1 to 2% going to $SO_3$. The presence of iron oxide, vanadium and other metals at the proper temperature range produces this oxidation. Selective catalytic reduction (SCR) are also widely known to oxidize a portion of the $SO_2$ in the flue gas to $SO_3$. The catalyst formulation (primarily the amount of vanadium in catalyst) impacts the amount of oxidation, with rates ranging from 0.5% to over 1.5%. Most typical is around 1%. Therefore plants firing a high sulfur coal with a new SCR can see a large increase in the $SO_3$ emissions, which produce a visible plume, local acidic ground level problems and other environmental issues.

Regenerative air preheaters condense or trap a portion of the $SO_3$ in the flue gas. This action depends primarily on the heat transfer plate temperatures, with the most critical parameter being the hottest temperature of the cold end elements. (The Air Preheater—A Component for Emission Reduction ($CO_2+SO_3$), VGB Kraftwerkstechnik 75 (1995), Number 11). If one wants to capture a large amount of $SO_3$ then the hottest or highest minimum cold end metal temperature (the temperature at the extreme gas out end of the element, assuming that each heat exchange element layer has the same element and gauge) must be below the acid dew point by some margin. In addition, coal having more alkaline fly ash (i.e., those with higher concentrations of MgO and CaO), allow operation at lower temperatures without experiencing heavy fouling.

For existing power plants it is often impossible, or very costly, to reduce the element temperatures to the level required to obtain sufficient removal of the $SO_3$. The installed regenerative air preheater has a fixed depth for containing heat exchange elements that places a limitation on the amount of heat recovery possible (hence limitation to cold end metal temperature reduction). If additional surface area is installed within the existing air preheater, limitations of increased pressure drop and too small a hydraulic diameter are reached. A small hydraulic diameter is equivalent to a smaller flow area that is more prone to pluggage and results in faster pressure drop increases when fixed amounts of fouling deposits occur.

SUMMARY OF THE INVENTION

Briefly stated, the invention in a preferred form is an air preheater for use with a boiler which discharges a flow of flue gas containing $SO_3$. The air preheater comprises a housing having oppositely disposed hot and cold ends. The hot end includes an air outlet duct and a flue gas inlet duct, the air outlet duct having a combustion air duct and an excess air duct. The cold end includes an air inlet duct and a flue gas outlet duct. The air inlet duct provides fluid communications with the atmosphere for receiving a flow of air. The combustion air duct provides fluid communications with the boiler for supplying a flow of combustion air to the boiler and the excess air duct provides fluid communications with the atmosphere for discharging a flow of excess air. The flue gas inlet duct provides fluid communications with the boiler for receiving the flow of flue gas and the flue gas outlet duct provides fluid communications with the atmosphere for discharging the flue gas. The air preheater also comprises a rotor rotatably mounted in the housing. The rotor includes an air sector in fluid communication with the air inlet and outlet ducts and a flue gas sector in fluid communication with the flue gas inlet and outlet ducts. At least one sector plate separates the air sector from the flue gas sectors. A plurality of heat exchange element basket assemblies rotate through the air and flue gas sectors, with the heat exchange element basket assemblies absorbing heat from the flow of flue gas in the flue gas sector and discharging heat to the flow of air in the air sector. The flow of excess air cools the heat exchange basket element assemblies below the dew point of the $SO_3$, thereby condensing the $SO_3$ for removal from the flow of flue gas.

The air outlet duct also has a wall separating the combustion air duct from the excess air duct. The wall also divides the air sector of the rotor into first and second segments, with the combustion air duct receiving the air flow through the first segment and the excess air duct receiving the air flow through the second segment. Each of the heat exchange element basket assemblies rotating out of the flue gas sector first enters the first segment of the air sector and then enters the second segment of the air sector.

A boiler system having the boiler and air preheater described above also includes a stack and an outlet ductwork providing fluid communication between the flue gas outlet duct of the air preheater and the stack. The outlet ductwork may discharge the flow of excess air directly to atmosphere. Alternatively, the excess air duct may be in fluid communication with the outlet ductwork to discharge the flow of excess air through the stack.

The boiler system also includes an inlet ductwork providing fluid communication between the boiler and the flue gas inlet duct of the air preheater. The boiler system may include apparatus for injecting an alkaline material into the inlet ductwork. Alternatively, the boiler system may include apparatus for injecting a precursor to an alkaline material into the boiler.

The boiler system includes a first particulate removal device positioned between the air preheater and the stack, dividing the outlet ductwork into a first segment extending between the air preheater and the first particulate removal device and a second segment extending between the first particulate removal device and the stack. The excess air duct may be in fluid communication with the first segment of the outlet ductwork. Alternatively, the boiler system may include a second particulate removal device in fluid communication with the excess air duct and the second segment of the outlet ductwork.

It is an object of the invention to provide a steam generating system which removes a large percentage of flue gas borne $SO_3$ in the existing regenerative air preheater.

It is also an object of the invention to provide a steam generating system which minimizes fouling and corrosion problems associated with the removal of flue gas borne $SO_3$.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

The majority of steam generating systems utilize regenerative air preheaters to increase the boiler efficiency, with the largest portion being the Ljungstrom™ type regenerative air preheater. This type of air preheater features rotating heat exchange elements. A different type of regenerative air preheater utilizes fixed heat exchange elements and internally rotating hoods or ductwork fixed to the rigid air and gas ducts. The subject invention relates to boiler systems equipped with either type of regenerative air preheater. To facilitate discussion, the inventive arrangement will be discussed in combination with a rotary regenerative air preheater.

Figure 1:
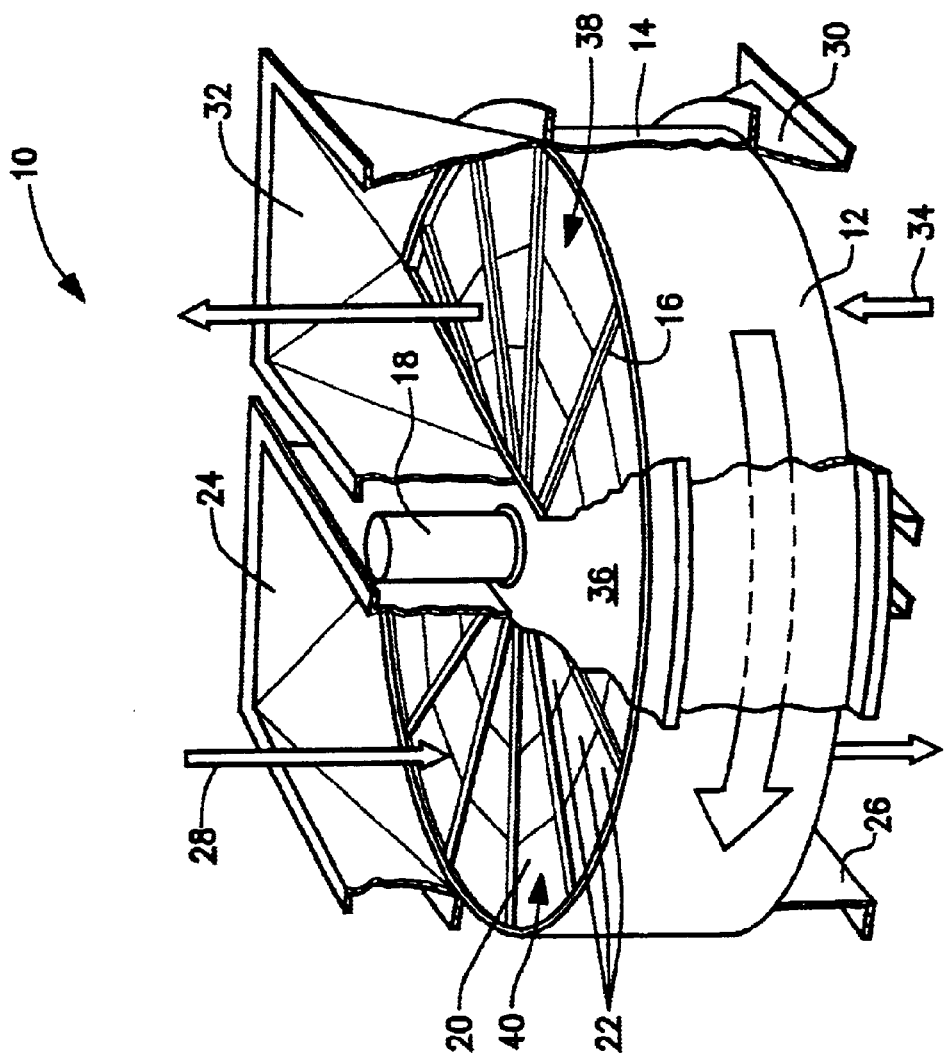
FIG. 1 is a perspective view, partially broken away, of a conventional rotary regenerative air preheater.

With reference to FIG. 1 of the drawings, a conventional rotary regenerative preheater is generally designated by the numerical identifier 10. The air preheater 10 has a rotor 12 rotatably mounted in a housing 14. The rotor 12 is formed of diaphragms or partitions 16 extending radially from a rotor post 18 to the outer periphery of the rotor 12. The partitions 16 define compartments 20 therebetween for containing heat exchange element basket assemblies 22.

The housing 14 defines a flue gas inlet duct 24 and a flue gas outlet duct 26 for the flow of heated flue gases 28 through the air preheater 10. The housing 14 further defines an air inlet duct 30 and an air outlet duct 32 for the flow of air 34 through the preheater 10. Sector plates 36 extend across the housing 14 adjacent the upper and lower faces of the rotor 12. The sector plates 36 divide the air preheater 10 into an air sector 38 and a flue gas sector 40. The arrows of FIG. 1 indicate the direction of a flue gas stream 28 and an air stream 34 through the rotor 12. The hot flue gas stream 28 entering through the flue gas inlet duct 24 transfers heat to the heat exchange element basket assemblies 22 mounted in the compartments 20 positioned in the flue gas sector 40. The heated heat exchange element basket assembles 22 are then rotated to the air sector 38 of the air preheater 10. The stored heat of the heat exchange element basket assemblies 22 is then transferred to the air stream 34 entering through the air inlet duct 30. The cold flue gas stream exits the preheater 10 through the flue gas outlet duct 26 and the heated air stream exits the preheater 10 through the air outlet duct 32.

Figure 3:
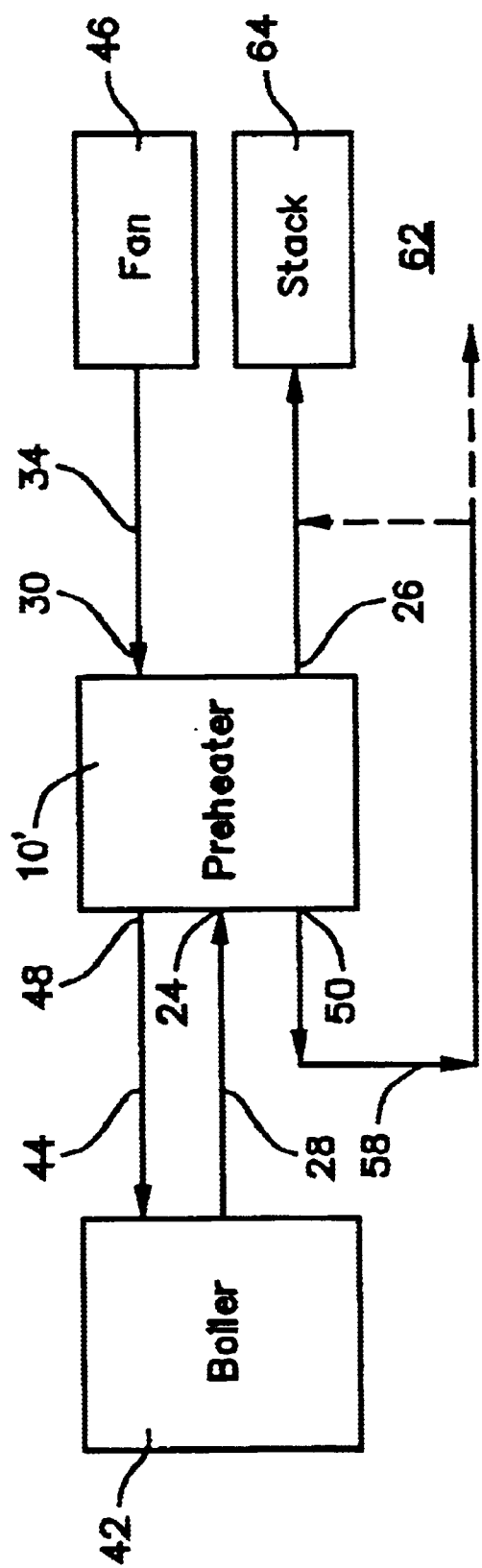
FIG. 3 is a schematic view of a first embodiment of a steam generating system having boiler and regenerative air preheater arrangement in accordance with the invention.

With reference to FIG. 3, a steam generating system having an arrangement for capturing $SO_3$ in accordance with the invention includes a boiler 42 which burns a fossil fuel, such as coal, which includes a sulfur. During the combustion process, the sulfur in the fuel is oxidized to $SO_2$. After the combustion process, some amount of $SO_2$ is further oxidized to $SO_3$ which is entrained in the flue gas stream 28 exiting the boiler 42. To improve the efficiency of the combustion process, a regenerative air preheater 10' transfers heat from the flue gas stream 28 to the combustion air stream 44 entering the boiler 42. Generally, a fan 46 provides the motive force required to push the air stream 34 through the air preheater 10'.

To condense the $SO_3$ so that it may be effectively removed from the flue gas stream 28 as it passes through the air preheater 10', the maximum temperature of the cold end element of the air preheater 10' is reduced to a predetermined value below the acid dew point. To effect such a reduction in temperature without modifying the heat transfer capability of the air preheater 10', an additional quantity of air, above the quantity that is required for combustion, is circulated through the air preheater 10'. This flow of excess or "cooling" air 58 absorbs an amount of heat from the heat transfer elements which is in addition to the heat which is absorbed by the combustion air stream 44, thereby cooling the elements to a lower temperature. The volumetric flow rate of this excess air is selected to provide the desired cold end element maximum temperature.

Figure 2:
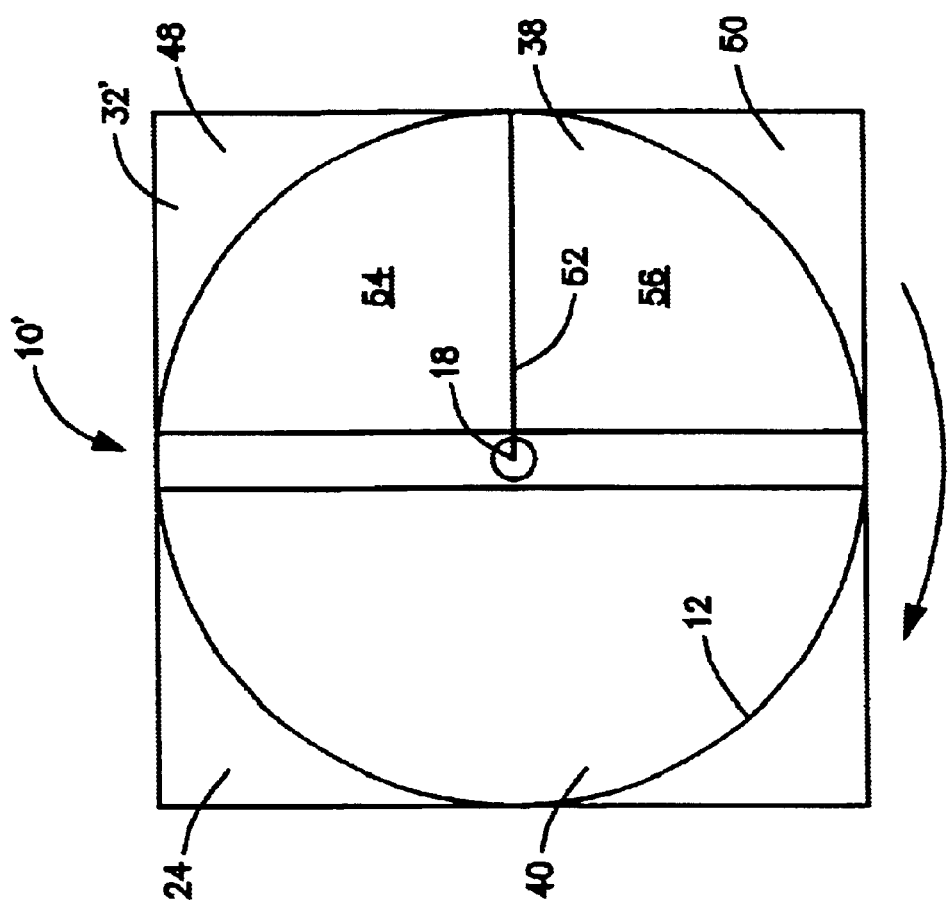
FIG. 2 is a simplified top plan view of a rotary regenerative air preheater in accordance with the invention.

With reference to FIG. 2, the air outlet duct 32' of the air preheater 10' includes a combustion air duct 48 and an excess air duct 50. The wall 52 separating the combustion air duct 48 from the excess air duct 50 divides the air sector 38 into first and second segments 54, 56, with the combustion air duct 48 receiving the air flow through the first segment 54 and the excess air duct 50 receiving the air flow through the second segment 56. It should be appreciated that a certain amount of the particulate matter carried by the flue gas stream 28 is deposited on the surfaces of the heat exchange elements. After the heat exchange element basket assemblies 22 rotate from the flue gas sector 40 into first segment 54 of the air sector 38, the combustion air stream 44 scours the majority of the deposited particulate matter from the surfaces of the heat exchange elements and carries it back to the boiler 42. Consequently, only a minority of the deposited particulate matter remains to be scoured from the surfaces of the heat exchange elements by the excess air stream 58 after the heat exchange element basket assemblies 22 rotate from first segment 54 into second segment 56. In addition, the temperature of combustion air stream 44 is higher than the temperature of the excess air stream 58. This is due to the fact that the heat exchange elements in segment 54 are hotter than those in segment 56, since the heat exchange elements in segment 54 have just rotated out of the hot flue gas 40.

Figure 4:
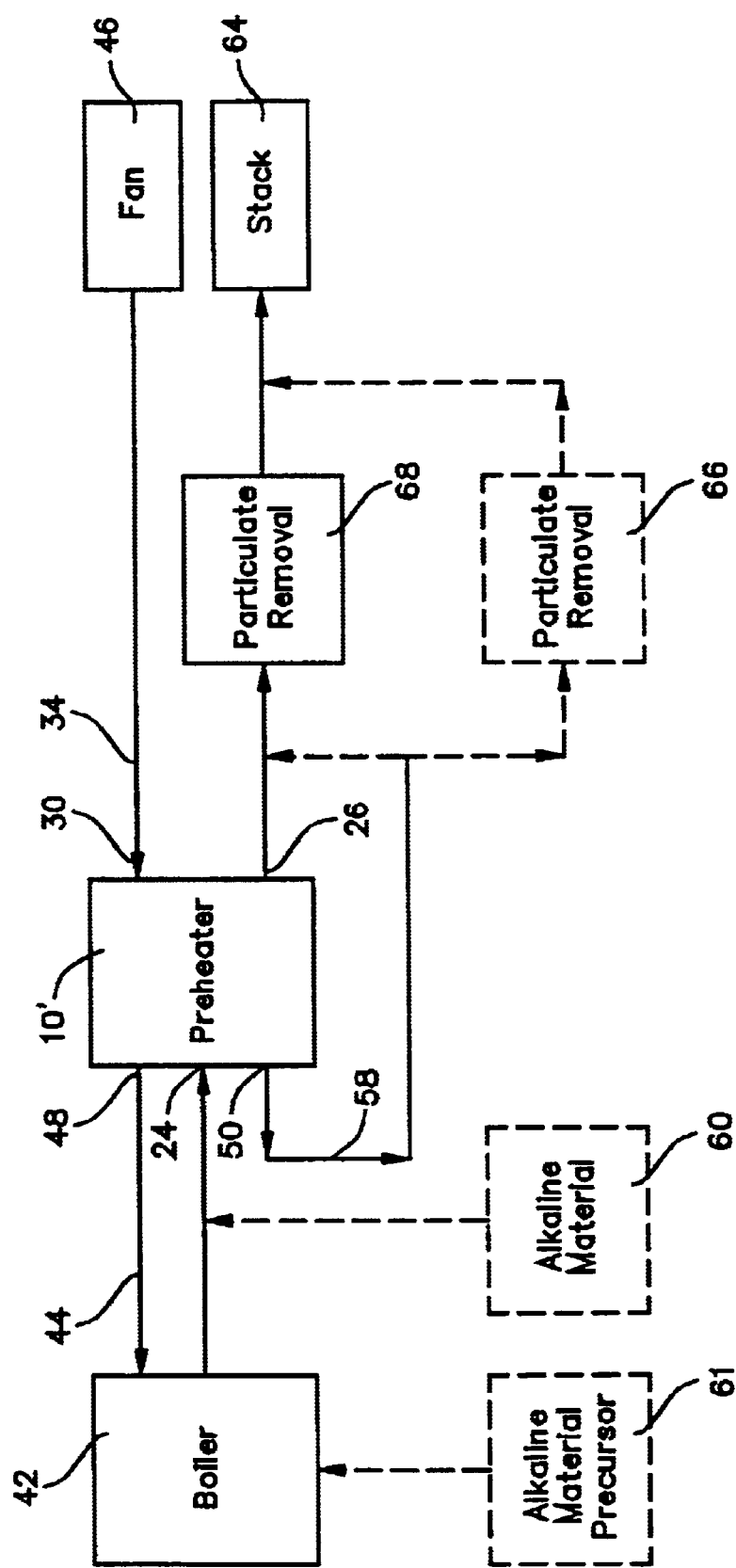
FIG. 4 is a schematic view of a second embodiment of a steam generating system having a boiler and regenerative air preheater arrangement in accordance with the invention.

If the rate of fouling of the air preheater 10' proves to be too great or if it is anticipated to be too great, an alkaline material 60 (e.g. lime or magnesium oxide) may be injected into the steam generator system intermediate the boiler 42 and the air preheater 10' (FIG. 4). Alternatively, an alkaline material precursor 61, such as limestone, may be injected into the boiler 42 where it is calcined. The amount of the material 60 would be selected such that the deposits formed by the $SO_3$, the fly ash and additive mixture would be removable and maintainable by cold end soot blowing, and infrequent water washes of the air preheater 10'.

If the particulate loading of the excess air stream 58 exhausted from the regenerative air preheater 10' is sufficiently low, it may simply be exhausted to atmosphere 62 (FIG. 3). Alternatively, the excess air stream 58 may be discharged into the flue gas stream at a location intermediate the air preheater 10' and the stack 64. In this event, the excess air stream 58 will increase the buoyancy of the flue gases leaving the stack, thereby improving local ground level amounts of pollutants.

If the particulate loading of the excess air stream 58 exhausted from the air preheater 10' is too great, the excess air stream 58 may be discharged through a separate particulate removal device 66, if site requirements and economics dictate. Alternatively, the excess air stream 58 could be discharged into the flue gas stream at a position intermediate the air preheater 10' and the system particulate removal device 68 (e.g. an electro-static precipitator (ESP) or a bag house)(FIG. 4). If a wet flue gas desulferization device (not shown) is employed, the excess air stream 58 may be used to reheat the flue gases exiting the scrubber to eliminate visible plume, reduce corrosion in stack 64, and to reduce the local ground level amounts of pollutants.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An air preheater for use with a boiler, the boiler receiving a flow of combustion air and a sulfur-containing fuel, burning the fuel, and discharging a flow of flue gas containing $SO_3$, the air preheater comprising:

a housing including oppositely disposed hot and cold ends, the hot end including an air outlet duct and a flue gas inlet duct, the cold end including an air inlet duct and a flue gas outlet duct, the air outlet duct having a combustion air duct and an excess air duct, the air inlet duct being adapted to provide fluid communications with the atmosphere for receiving a flow of air, the combustion air duct being adapted to provide fluid communications with the boiler for supplying the flow of combustion air, the excess air duct being adapted to provide fluid communications with the atmosphere for discharging a flow of excess air, the flue gas inlet duct being adapted to provide fluid communications with the boiler for receiving the flow of flue gas, the flue gas outlet duct being adapted to provide fluid communications with the atmosphere for discharging the flue gas; and a rotor rotatably mounted in the housing, the rotor including an air sector in fluid communication with the air inlet and outlet ducts, a flue gas sector in fluid communication with the flue gas inlet and outlet ducts, at least one sector plate separating the air and flue gas sectors, and a plurality of heat exchange element basket assemblies rotating through the air and flue gas sectors, the heat exchange element basket assemblies absorbing heat from the flow of flue gas in the flue gas sector and discharging heat to the flow of air in the air sector;

wherein the $SO_3$ has a dew point and the flow of excess air further cools the flow of flue gas below the dew point of the $SO_3$.

2. The air preheater of claim 1 wherein the air outlet duct also has a wall separating the combustion air duct from the excess air duct.

3. The air preheater of claim 2 wherein the wall divides the air sector of the rotor into first and second segments, the combustion air duct receiving the air flow through the first segment and the excess air duct receiving the air flow through the second segment.

4. The air preheater of claim 3 wherein each of the heat exchange element basket assemblies rotating out of the flue gas sector first enters the first segment of the air sector and then enters the second segment of the air sector.

5. A boiler system comprising:

a boiler discharging a flow of flue gas containing $SO_3$; and an air preheater including a housing having oppositely disposed hot and cold ends, the hot end including an air outlet duct and a flue gas inlet duct, the cold end including an air inlet duct and a flue gas outlet duct, the air outlet duct having a combustion air duct and an excess air duct, the air inlet duct being adapted to provide fluid communications with the atmosphere for receiving a flow of air, the combustion air duct being in fluid communications with the boiler for supplying a flow of combustion air, the excess air duct being adapted to provide fluid communications with the atmosphere for discharging a flow of excess air, the flue gas inlet duct being in fluid communications with the boiler for receiving the flow of flue gas, the flue gas outlet duct being adapted to provide fluid communications with the atmosphere for discharging the flue gas, and a rotor rotatably mounted in the housing, the rotor including an air sector in fluid communication with the air inlet and outlet ducts, a flue gas sector in fluid communication with the flue gas inlet and outlet ducts, at least one sector plate separating the air and flue gas sectors, and a plurality of heat exchange element basket assemblies rotating through the air and flue gas sectors, the heat exchange element basket assemblies absorbing heat from the flow of flue gas in the flue gas sector and discharging heat to the flow of air in the air sector;

wherein the $SO_3$ has a dew point and the flow of excess air cools the flow of flue gas below the dew point of the $SO_3$.

6. The boiler system of claim 5 further comprising:

a stack; and an outlet ductwork providing fluid communication between the flue gas outlet duct of the air preheater and the stack, the excess air duct being in fluid communication with the outlet ductwork.

7. The boiler system of claim 6 further comprising:

an inlet ductwork providing fluid communication between the boiler and the flue gas inlet duct of the air preheater; and means for injecting an alkaline material into the inlet ductwork.

8. The boiler system of claim 7 wherein the alkaline material is calcium oxide or magnesium oxide.

9. The boiler system of claim 6 further comprising means for injecting a precursor to an alkaline material into the boiler.

10. The boiler system of claim 9 wherein the precursor to an alkaline material is limestone.

11. The boiler system of claim 6 wherein the outlet ductwork includes first and second segments and the boiler system further comprises a first particulate removal device disposed intermediate the first and second segments, the first segment of the outlet ductwork providing fluid communications between the air preheater and the first particulate removal device and the second segment of the outlet ductwork providing fluid communications between the first particulate removal device and the stack.

12. The boiler system of claim 11 wherein the excess air duct is in fluid communication with the first segment of the outlet ductwork.

13. The boiler system of claim 11 further comprising a second particulate removal device in fluid communication with the excess air duct and the second segment of the outlet ductwork.

14. The boiler system of claim 5 wherein the air outlet duct also has a wall separating the combustion air duct from the excess air duct.

15. The boiler system of claim 14 wherein the wall divides the air sector of the rotor into first and second segments, the combustion air duct receiving the air flow through the first segment and the excess air duct receiving the air flow through the second segment.

16. The boiler system of claim 15 wherein each of the heat exchange element basket assemblies rotating out of the flue gas sector first enters the first segment of the air sector and then enters the second segment of the air sector.

* * * * *